United States Patent [19]

Saunders

[11] Patent Number: 5,739,443
[45] Date of Patent: Apr. 14, 1998

[54] CARRIER FOR A MONITORING DEVICE

[76] Inventor: Roger I. Saunders, 92 Van Dyke Rd., P.O. Box 136, Hollis, N.H. 03049-0136

[21] Appl. No.: 626,669

[22] Filed: Apr. 1, 1996

[51] Int. Cl.[6] .................................................. G01D 21/00
[52] U.S. Cl. .................................................. 73/866.5; 274/208
[58] Field of Search .................. 73/866.5, 152.17; 374/208, 140, 155

[56] References Cited

U.S. PATENT DOCUMENTS

| | | |
|---|---|---|
| 2,588,717 | 3/1952 | Goodwin ............................ 73/152.17 |
| 3,423,671 | 1/1969 | Vezin ................................ 73/152.17 |
| 3,677,081 | 7/1972 | Newton et al. ....................... 73/155 |
| 5,379,655 | 1/1995 | Yeakle ............................... 73/865.7 |

FOREIGN PATENT DOCUMENTS

| | | | |
|---|---|---|---|
| 57974 | 2/1998 | Japan | 73/866.5 |
| 687357 | 9/1979 | U.S.S.R. | 73/40.5 P |

OTHER PUBLICATIONS

Brochures of Saunders Technology, Inc.: "Reflow Rider is Really Easy to Use" Nov. 1995.

*Primary Examiner*—Hezron E. Williams
*Assistant Examiner*—Nashmiya Fayyaz
*Attorney, Agent, or Firm*—Robert G. Crooks

[57] ABSTRACT

A carrier for supporting a monitoring device during passage of the carrier and the monitoring device through a processing machine. The carrier is especially adapted for conveying temperature-recording instrumentation following circuit boards undergoing mass soldering of surface-mount and/or through-hole components.

25 Claims, 6 Drawing Sheets

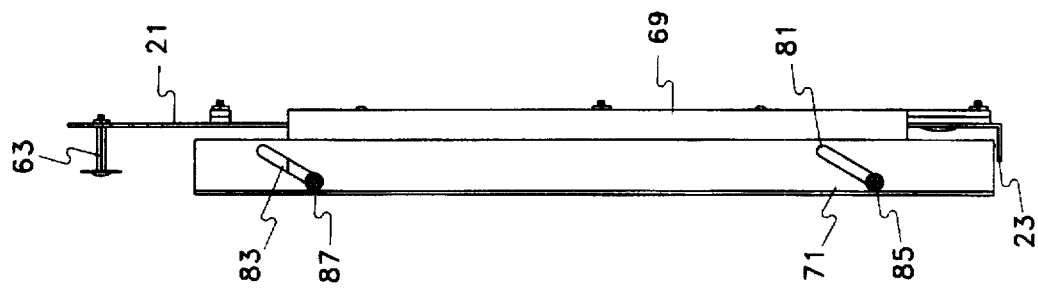
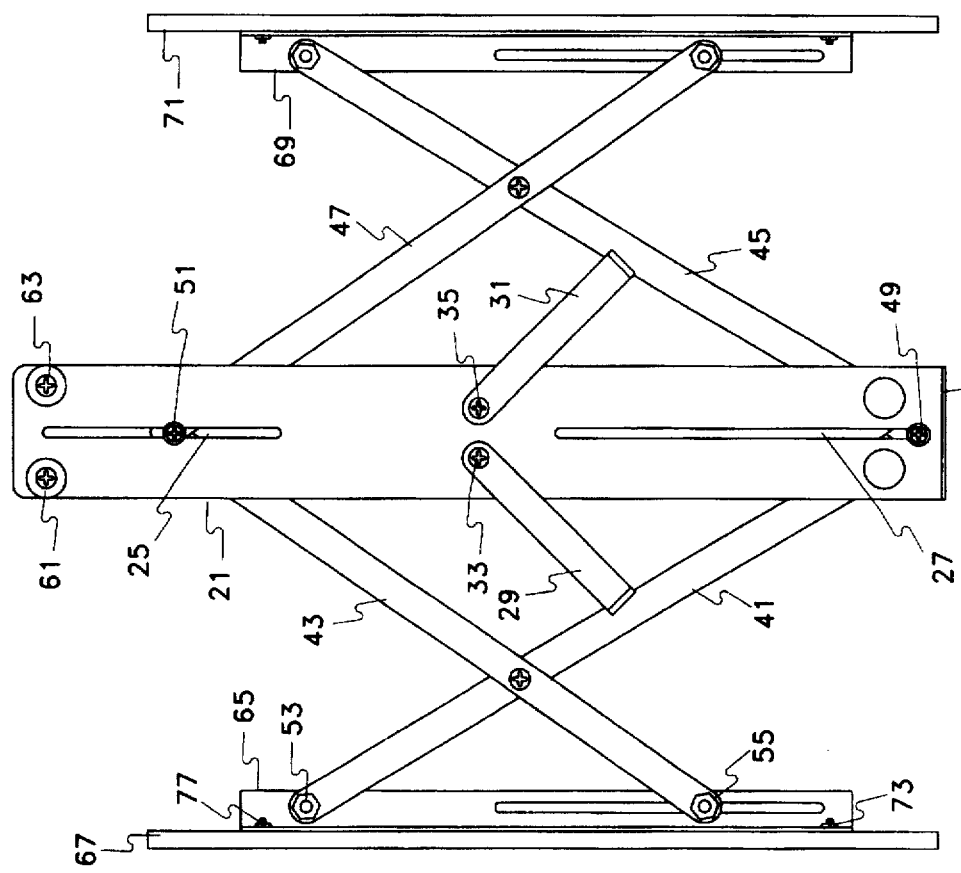

CARRIER FOR A MONITORING DEVICE

BACKGROUND OF THE INVENTION

1. Field fo the Invention

This invention relates to a carrier for a thermal-monitoring device, or other instrumentation, especially suited for use with electronic circuit boards while having the connections of their circuit components soldered in an oven or similar processing equipment. The carrier is readily adjustable in width, and may also be easily structured as to height. This feature becomes important when a monitoring device such as a "thermal profiler" accompanies one or more circuit boards through a processing machine known as a "reflow oven." A thermal profiler is commonly used to record temperatures of components on one or more circuit boards during the mass soldering of those components on the boards by any means, including "surface-mount" technology. An advantage of this technology flows from the fact that the electronic components may be surface mounted on both sides of the circuit board.

Although one embodiment of the invention is especially suited for use in the surface mounting of electronic components on circuit boards in an oven of the reflow type, another, and somewhat simpler, version of the invention is useful in the processing of circuit boards by means of wave-soldering machines. The invention comprehends carriers for instrumentation, of whatever nature, as used in both wave-soldering and reflow types of processing ovens. Indeed, the carrier in accordance with this invention may be used in industrial processes not involving the soldering of circuit boards, and may be useful in instrumented processes outside the electronic industry.

2. Description of the Prior Art

In the assembly of electronic circuit boards, it is common practice to position the components on the surface of the board and then to solder all the connections among the components in a single "mass-soldering" step. Particularly when soldering circuit boards having semiconductor electronic components, as most do, it is important to assure that those semiconductor components are not subjected to temperatures above certain critical maximum levels. On the other hand, the temperature of the joints being soldered must be higher than certain critical minimum levels in order to have the solder flow into all the desired interstices, so as to form satisfactory joints when the solder later cools and solidifies. Thus, each component may have a range of temperatures within which it must remain during its soldering process. The formation of satisfactory soldered joints on circuit boards is a function not only of temperature but also of time. Both the formation of satisfactory joints and the protection of the electronic components against thermal damage depend upon time of exposure to certain temperatures and the rate of change of temperatures. This is particularly true for ovens which provide a linear series of individually- controlled heating zones through which each circuit board passes on a conveyor or on a pair of endless chains, which may desirably travel at a uniform rate.

The temperature in each controlled heating zone is preset so that each circuit-board assembly being processed therein should experience a desired "profile" of temperature as a function of time as the board travels through the length of the oven. As aforementioned, the permissible range of temperature, as a function of time, for each component of each circuit board may not be very broad.

In order to determine whether the temperatures of the respective heating zones of the oven are set correctly to produce the desired temperature profile on a given circuit-board assembly, at least one circuit board of a series in test or production is usually temporarily equipped with thermocouples or other temperature sensors, placed at selected locations on the board. These selected locations may correspond to certain electronic components which have the narrowest permissible ranges of temperature, especially as a function of time. The thermocouples are electrically connected to a data logger, commonly referred to as a "thermal profiler," which records the profile of temperature as a function of time for each of the thermocouples, or other temperature sensors, as the circuit board passes through the length of the oven. Connections may be made from the thermocouples, or other temperature sensors, to respective input terminals of the thermal profiler by means of short wire leads.

The thermal profiler is usually enclosed in an insulated thermal barrier, and is carried through the oven, closely behind the circuit board, by the same conveyor system that transports the circuit-board assembly. In ovens of the reflow type, a motor-driven wire-mesh belt has generally been provided. This belt could convey both the circuit-board assembly and a thermal profiler, as needed. For many applications, this arrangement was satisfactory, and still is, in certain circumstances. In those circumstances, the thermal profiler simply rides behind the circuit-board assembly on the wire-mesh belt, connected to the respective temperature sensors by wire leads.

But those circumstances are becoming more and more limited as the design of circuit boards becomes more complex. As the need to affix electronic components to both sides of a circuit board has become more insistent, the use of a wire-mesh conveyor belt has become less attractive. In many cases, it is not practical to place on a wire-mesh conveyor belt a circuit board having electronic components on its lower face. The components could thereby be shifted in position, preventing the formation of good electrical contacts and good soldered joints.

In processing ovens of the reflow type, it is becoming customary to equip the oven with "edge conveyors," instead of a wire-mesh belt, for supporting the circuit boards undergoing mass soldering. The edge conveyors include a pair of parallel endless loop chains, passing through the length of the oven and back again. Each of the joints of articulation of the conveyor chains is likely to be fitted with an inwardly-extending pivot pin which protrudes a fraction of an inch inward, from each chain toward the other, to form a pair of narrow, moving ledges which can cooperate to support the respective opposite edges of a circuit board undergoing processing. The distance between the two parallel chains of the conveyor is adjusted to match closely the width of the circuit boards to be soldered. When properly adjusted, the protruding pins support the two opposite sides of the circuit boards while conveying the boards through the length of the oven during the process of soldering. It has generally been necessary to mount the profiler on a piece of plastic laminate, or other board, especially tailored to conform to the width of the circuit boards being processed at any particular time. If the width of the circuit boards being processed changes by a fraction of an inch, the width of the support for the profiler would likewise have to change to conform to the resetting of the spacing between the conveyor chains necessitated by the change in dimensions of the circuit boards being processed.

A relatively new development in mass-soldering technology has presented another challenge to the designer of equipment for instrumenting the temperature profile of the circuit boards being processed. The soldering operations in many reflow ovens are executed now in a fairly "inert" atmosphere in order to minimize oxidation of joints during the process of soldering. For instance, nitrogen gas could be introduced into the oven to displace oxygen during the soldering process. Nitrogen is not inexpensive, and its escape from the oven during processing operations should be minimized. And yet, the oven must have openings to permit the entrance and egress of the circuit boards being continuously soldered therein. Accordingly, the manufacturers of the ovens have contrived a series of baffles at the entrance and exit points of the oven in order to minimize leakage of nitrogen through those openings. The openings are characterized by minimal width and height. The circuit boards, and the instrumentation following them, must fit through the openings defined by those dimensions of width and height. It is necessary to arrange for the profiler to pass through the "portals" of the oven substantially in the middle of the available opening in order to avoid striking the baffles. To this end, some manufacturers of circuit boards have fabricated special fixtures to set the height of the profiler so that it passes through the respective centers of the entrance and exit portals of the oven. But, again, with changes of instrumentation, or circuit boards, the height requirements have varied along with the width requirements to which reference has just been made. The manufacturer of circuit boards must devise a "fixture" for supporting the profiler, but each fixture would be satisfactory for only one width of circuit board in cooperation with one configuration of portals of the oven. The "armory" of necessary fixtures could become extensive.

Similarly, in wave-soldering machines, the circuit boards to be soldered may be gripped along two opposite edges by two parallel and opposing rows of "fingers" each attached to an endless conveyor-chain loop. The distance between the two opposing rows of fingers is adjusted to match the width of the circuit board to be soldered. These opposing rows of fingers then move together in the same direction to convey the boards through the mass-soldering process.

In order for a thermal profiler to trail a circuit board through a wave-soldering machine it has become the practice to mount the thermal profiler upon a sheet of plastic laminate, similar to that of the circuit board, and cut to a width identical to that of the circuit board having positioned thereon the electronic components to be soldered. The sheet bearing the thermal profiler would be gripped between opposing arrays of fingers on the conveyor in a manner similar to that in which the circuit boards themselves are gripped. Thus, an individually-"tailored" sheet of plastic laminate has been necessary for each width of circuit board with which a profiler is to be associated, again requiring an "armory" of tailored laminate sheets.

OBJECTS OF THE INVENTION

In view of the expense, inconvenience, and wastefulness of tailoring individual fixtures for conveying monitoring devices when the spacing between the conveyor chains is altered or when the height necessary to accommodate the portals of a reflow oven is changed, it is an object of this invention to provide a carrier which is adjustable to conform to changes in the width of circuit boards being put through a mass-soldering process.

It is another object of this invention to provide a carrier having a structure which can be easily changed to accommodate the height requirements of various soldering machines, particularly of the reflow type.

It is a further object of this invention to provide a carrier having a utility which is not confined to the conveyance of a temperature-monitoring device through a soldering machine, but which has broader applications in other industrial processes.

SUMMARY OF THE INVENTION

Briefly, the above-mentioned and other objects of this invention are fulfilled by my carrier which comprises at least the following four functional elements:

1. An elongated support deck having a longitudinal axis to be substantially aligned with the direction of passage of the carrier and the monitoring device through a processing machine;

2. First and second pairs of scissor arms, the inboard ends of each of said scissor arms being pivotally coupled with the support deck at points which are adjustable along the longitudinal axis thereof;

3. First and second rails pivotally coupled to outboard ends of respective pairs of the aforementioned scissor arms in such a way that the rails are always maintained parallel to the longitudinal axis of the elongated support deck, but are adjustable in their transverse distance from said longitudinal axis; and 4. A pair of arms pivotally coupled to said elongated support deck, and which are settable in position to confine a thermal profiler, or other instrumentation, against transverse relative motion with respect to the longitudinal axis of the elongated support deck.

If the height of the elongated support deck with respect to the machine through which the carrier is passing is a matter of importance, the rails would be constructed in compound form with inner rails and outer rails connected to one another in variable positions and in variable orientations with respect to one another. This change in structure is not a matter of mere adjustment.

BRIEF DESCRIPTION OF THE DRAWINGS

The invention summarized above will be described in detail in the following specification. The specification will be best understood if read while referring to the accompanying drawings, in which:

FIG. 6 is a plan view of the same second configuration of carrier;

FIG. 7 is an elevation view of the same second configuration of carrier;

DETAILED DESCRIPTION OF PREFERRED EMBODIMENTS OF THE INVENTION

Figure 1:
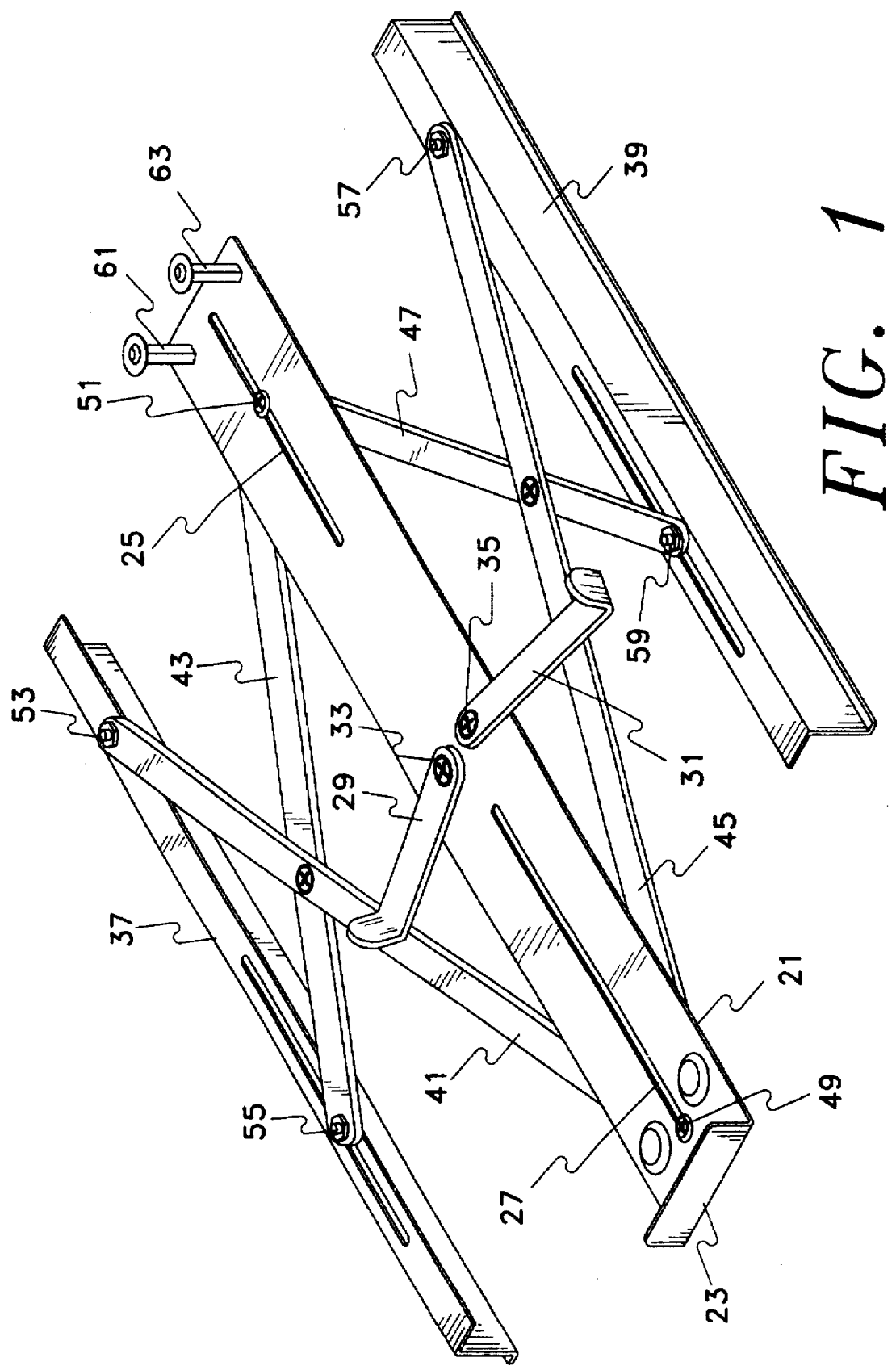
FIG. 1 is a perspective view of a first configuration of carrier in accordance with this invention.

FIG. 1 of the drawings illustrates a carrier which can support a thermal profiler, or other monitoring device, while it is carried through a wave-soldering machine. As has been explained, the carrier may follow through the machine the circuit board or boards having electronic components whose temperature, or the temperature of the joints therebetween, is to be monitored. According to the manufacturing practices which prevailed at the time of this invention, the width of the circuit boards may range anywhere from about 3" to about 20". The carrier in accordance with this invention can match any such circuit-board width. Of course, by scaling the carrier either upward or downward, it could be made to match circuit boards greater than 20" or less than 3" in width. The dimensions which will be mentioned in this specification are not to be taken as limiting, but are merely exemplary of the dimensions which are representative of current common practice.

Figure 4:
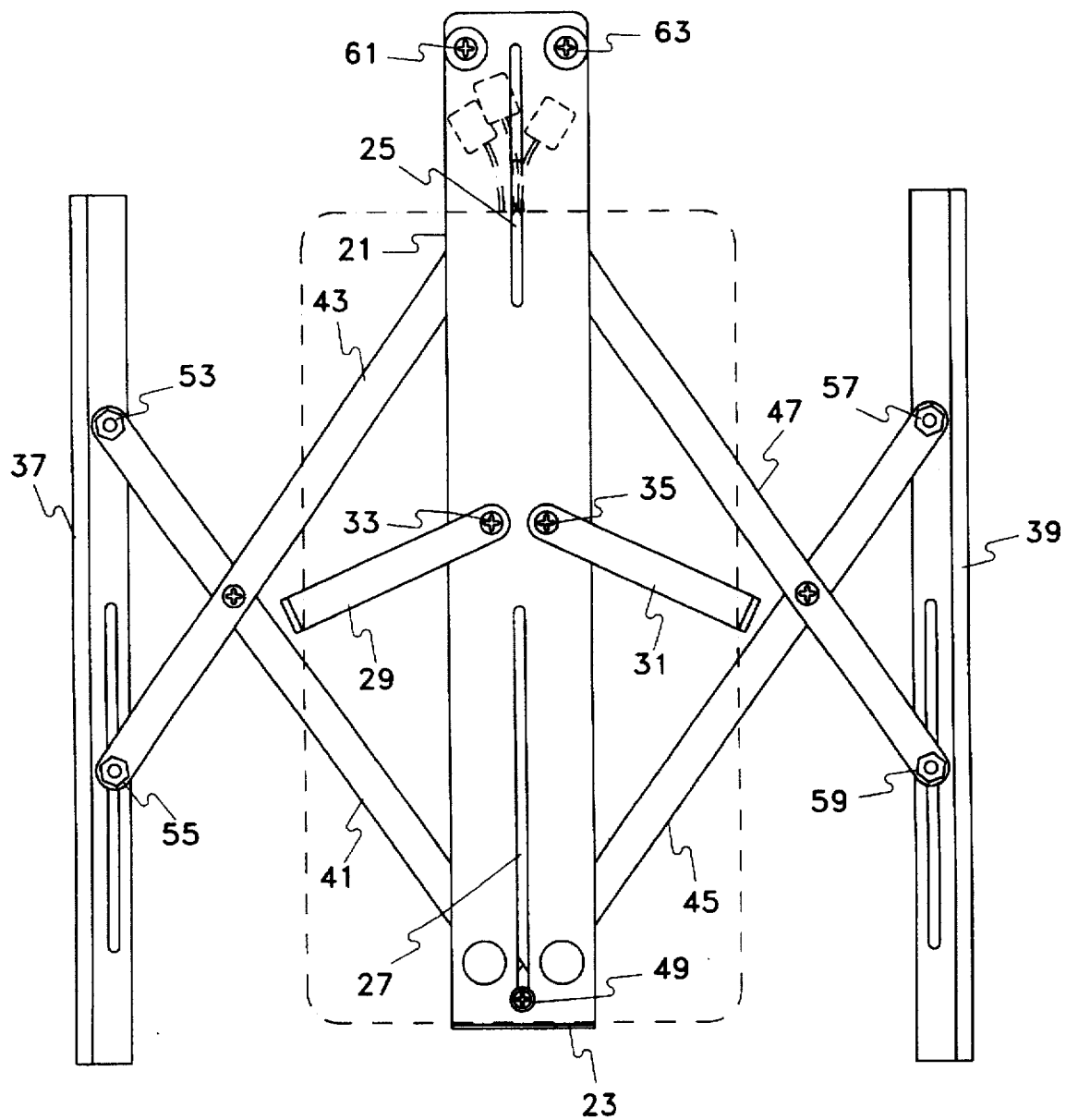
FIG. 4 is a plan view of the first configuration of carrier upon which is superimposed, in operating position, an instrumentation package as typified by a thermal profiler.

FIG. 1 of the drawings shows an elongated support deck 21, preferably having symmetry about a longitudinal axis. At one end of elongated support deck 21 is an upturned backstop 23 which may either be formed integrally by bending elongated support deck 21, or may be added thereto as a discrete structural element affixed to elongated support deck 21. Upturned backstop 23 represents the "back end" of the carrier in that it exerts a force urging the thermal monitoring device forward in the direction of passage of the carrier through the machine, as illustrated in FIG. 4 of the drawings. In elongated support deck 21 may be formed a forward longitudinal slot 25 and an aft longitudinal slot 27. Elongated support deck 21 may be made of a durable, light material such as hard anodized aluminum. Pivotally coupled to elongated support deck 21 at respective points, preferably adjacent to each other on the support deck, are a first pivoted support arm 29 and a second pivoted support arm 31, which extend outwardly from elongated support deck 21 on opposite sides thereof and at angles which can be readily adjusted. The purpose of first pivoted support arm 29 and second pivoted support arm 31 is to bear against the sides of the monitoring device, again as shown in FIG. 4 of the drawings. The upturned ends of the respective pivoted support arms stabilize the monitoring device against transverse motion with respect to the longitudinal axis of elongated support deck 21. First pivoted support arm 29 and second pivoted support arm 31 are settable in their angular positions with respect to the longitudinal axis of elongated support deck 21 by means of a first screw 33 and a second screw 35 respectively which can be tightened to lock the support arms in position. If the body of the monitoring device is symmetrical about the longitudinal axis of the elongated support deck, presumably the angular settings of first pivoted support arm 29 and second pivoted support arm 31 with respect to that longitudinal axis will be similar or identical. Furthermore, the optimum orientation of first pivoted support arm 29 and second pivoted support arm 31 with respect to the longitudinal axis of elongated support deck 21 will depend upon the length of the thermal monitoring device or other instrumentation package. If the monitoring device is relatively short, the pivoted support arms will be inclined toward upturned backstop 23; on the other hand, if the monitoring device is relatively long, the support arms will be inclined away from upturned backstop 23 so as to embrace the monitoring device at a pair of opposite points of contact where transverse motion of the monitoring device with respect to the longitudinal axis can best be prevented.

The carrier further comprises a first rail 37 and a second rail 39 which may have a "Z" cross section and which are oriented parallel to the longitudinal axis of elongated support deck 21 at the outer side boundaries of the carrier. They may desirably be formed of a metal such as titanium, to which molten solder will not adhere in a wave-soldering machine. As shown in FIG. 1 of the drawings, each of first rail 37 and second rail 39 includes an upper flange, which extends inwardly toward elongated support deck 21, and a lower flange, which extends outwardly away from elongated support deck 21. The lower flange of each of first rail 37 and second rail 39 is for engagement with inwardly-extending fingers of a wave-soldering-machine conveyor.

The respective upper flanges of first rail 37 and second rail 39 are pivotally coupled to respective ones of first and second pairs of scissor arms 41, 43, and 45, 47, all of which have inboard ends pivotally coupled to screws riding in either forward longitudinal slot 25 or aft longitudinal slot 27 of elongated support deck 21. Scissor arms 41 and 45 are coupled to elongated support deck 21 by a first pivot screw 49, whereas scissor arms 43 and 47 are coupled to elongated support deck 21 through a second pivot screw 51, which rides in forward longitudinal slot 25 of elongated support deck 21. While second pivot screw 51 and first pivot screw 49 ride freely in forward longitudinal slot 25 and aft longitudinal slot 27 respectively of elongated support deck 21, both of them may be tightened, or set, to maintain an established spacing between first rail 37 and second rail 39.

The spacing between first rail 37 and elongated support deck 21 is established by means of scissor arms 41 and 43 whose inboard ends are pivoted to elongated support deck 21 and whose respective outboard ends are pivoted to first rail 37 by means of a third pivot screw 53 and a fourth pivot screw 55. Fourth pivot screw 55 is free to slide back and forth in a longitudinal slot in the upper flange of first rail 37, thereby giving first rail 37 freedom to move transversely to the longitudinal axis of elongated support deck 21.

In a similar fashion, the spacing of second rail 39 from elongated support deck 21 is established by the action of scissor arms 45 and 47, which are respectively coupled to elongated support deck 21 by first pivot screw 49 and second pivot screw 51. They are also pivotally coupled to the upper flange of second rail 39 by, respectively, a fifth pivot screw 57 and a sixth pivot screw 59. Sixth pivot screw 59 is free to slide back and forth in a longitudinal slot in the upper flange of second rail 39. The sliding action of fourth pivot screw 55 in the longitudinal slot of first rail 37 and/or sixth pivot screw 59 in the longitudinal slot of second rail 39 enables first pivot screw 49 and second pivot screw 51 to provide adjustment of the spacing between first rail 37 and second rail 39, or the spacing between each of them and the longitudinal axis of elongated support deck 21. First pivot screw 49 is free to slide up and down in aft longitudinal slot 27 of elongated support deck 21, while second pivot screw 51 is free to slide up and down in forward longitudinal slot 25 of elongated support deck 21. In order to ensure the freedom of the respective pivot screws to slide back and forth in their respective slots and to tighten and untighten repetitively to lock and unlock their linked members, it is preferred that the pivot screws be made from stainless steel or some other material impervious to corrosion.

In order to use the carrier of this first configuration, second pivot screw 51 should be loosened so that it is free to slide in forward longitudinal slot 25, and first pivot screw 49 should be made snug but not tight at the aft end of aft longitudinal slot 27. Then, first rail 37 and second rail 39 should be separated so that their outside edges are spaced apart by the same distance as the width of the circuit board which the carrier is to follow through the wave-soldering machine or other processing equipment. Thereafter, second pivot screw 51 can be re-tightened to clamp the inboard ends of scissor arms 43 and 47 respectively. Finally, if the width of the circuit board is very great, first pivot screw 49 can be loosened and moved away from upturned backstop 23 in aft longitudinal slot 27 to increase still further the spacing between first rail 37 and second rail 39. Again, first pivot screw 49 would be tightened after the necessary spacing between first rail 37 and second rail 39 is attained.

The positioning of first pivoted support arm 29 and second pivoted support arm 31 to accommodate the monitoring device can be done either before or after the positioning of first rail 37 and second rail 39 to correspond to the width of the circuit board. However, if the pivoted support arms 29 and 31 are positioned before the rails 37 and 39, the monitoring device will have to be removed from the carrier in order to make room for the positioning of rails 37 and 39. If first pivot screw 49 and second pivot screw 51 are tightened, there is no need to tighten third pivot screw 53 or fourth pivot screw 55 or fifth pivot screw 57 or sixth pivot screw 59.

At the "forward" end of elongated support deck 21 are shown a first post 61 and a second post 63, set in the support deck, which may be used to accommodate excess length of electrical lead wires from the temperature sensors on the circuit board to the input terminals of the monitoring device. First post 61 and second post 63 are illustrated in FIG. 1 at the end of elongated support deck 21 remote from upturned backstop 23.

Figure 3:
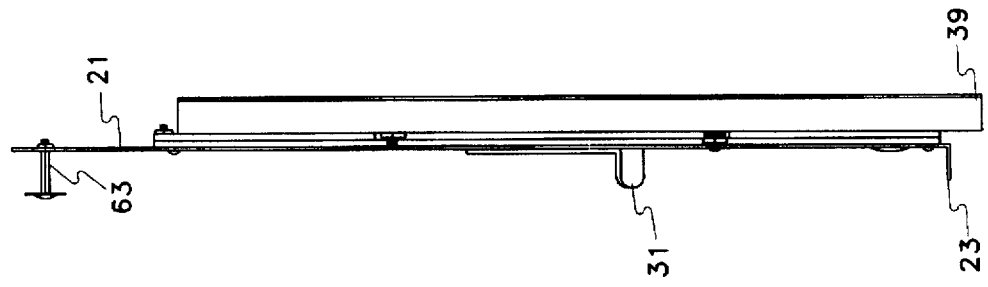
FIG. 3 is an elevation view of the same first configuration of carrier.
Figure 2:
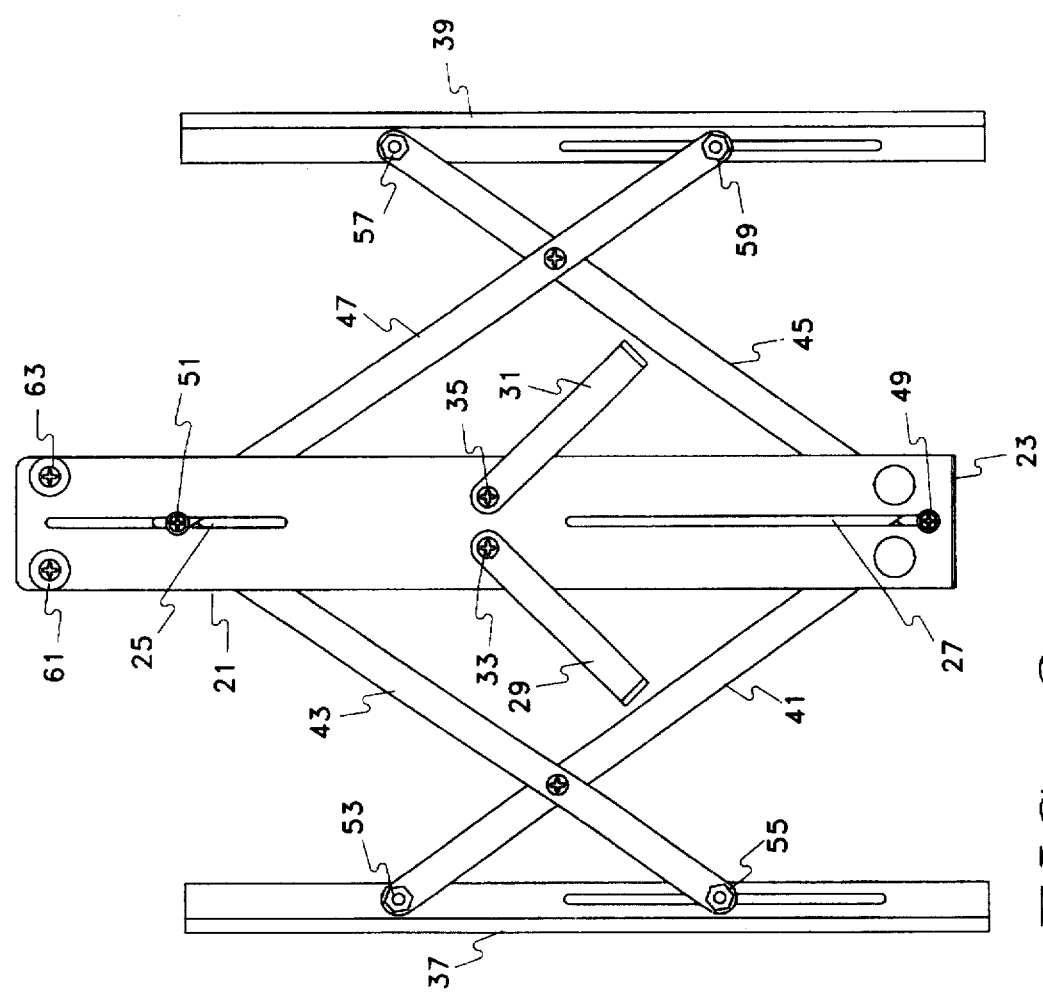
FIG. 2 is a plan view of the same first configuration of carrier.

FIG. 2 and FIG. 3 are, respectively, a plan view and an elevation view of the carrier shown in perspective view in FIG. 1 and described in the foregoing paragraphs.

FIG. 4 supplements the aforementioned figures of the drawings by showing a typical monitoring device in position atop the carrier which has just been described. Typically, the monitoring device is a "data logger" which comprises a plurality of recorders, each connected to an input terminal of the device which is, in turn, connected through a lead wire to a temperature sensor applied to an electronic component of the circuit-board assembly undergoing soldering. The monitoring device is typically rather bulky because it is sheathed in insulating material to protect it against the high temperatures to be encountered in passage through the wave-soldering machine or the reflow oven, as the case may be.

Figure 5:
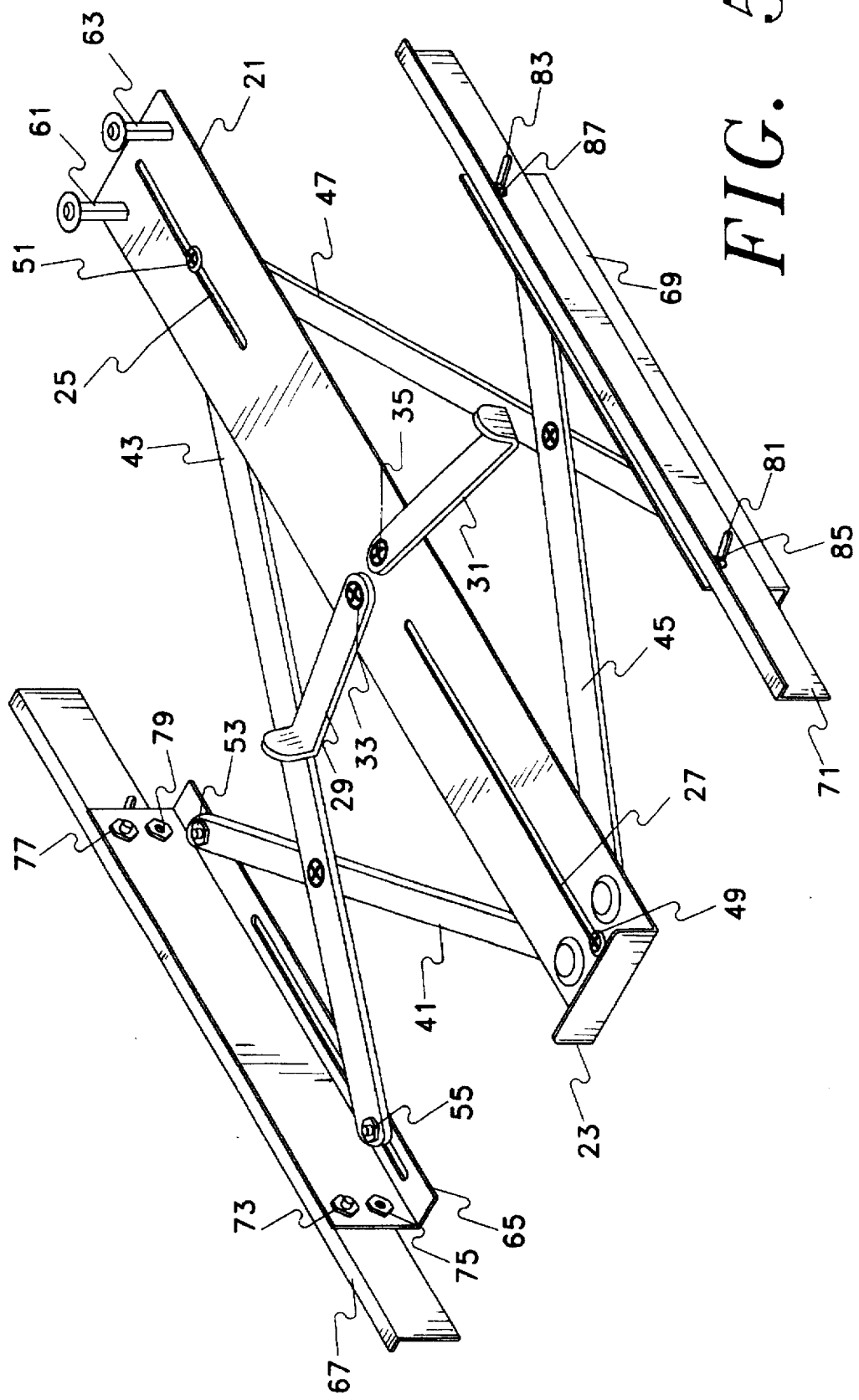
FIG. 5 is a perspective view of a second configuration of carrier in accordance with the invention.

Turning to FIG. 5 of the drawings, we see a second configuration of the carrier in accordance with the invention. In the configuration illustrated in FIG. 5, the elongated support deck 21, the first and second pivoted support arms 29 and 31, and the scissor arms 41 through 47 are similar or identical to those structural elements as illustrated in FIG. 1. However, the "rails" in the configuration of FIG. 5 are significantly different from the rails illustrated in FIG. 1, and, accordingly, will be given new reference numerals.

In place of first rail 37, there appear a first inner rail 65 and a first outer rail 67. Similarly, in place of second rail 39 of FIG. 1, FIG. 5 shows a second inner rail 69 and a second outer rail 71. As shown in FIG. 5 and in FIG. 8 through FIG. 11, each of the inner and outer rails has an L-shaped cross section. The vertical portion of first inner rail 65 and of second inner rail 69 rises upwardly from the horizontal portion of those respective rails. On the other hand, the vertical portions of first outer rail 67 and second outer rail 71 extend either upward or downward from the respective horizontal portions of those rails. The horizontal portions, or flanges, of first outer rail 67 and second outer rail 71 are to rest on the ledge formed by the inwardly-extending pins of the articulated joints of the endless chains of the edge conveyors of the soldering machine, particularly a reflow oven.

Figure 8:
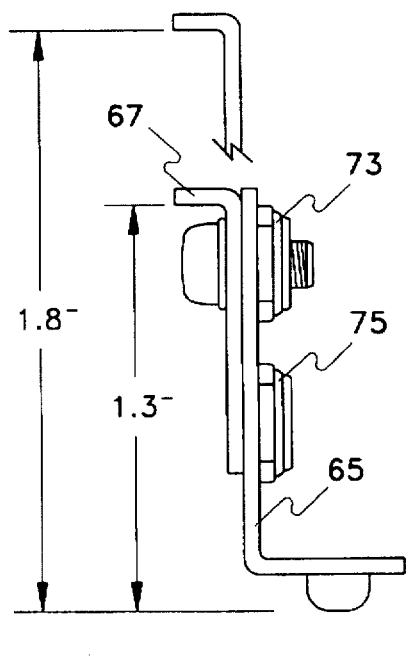
FIG. 8 is an end view of an inner and an outer rail of a carrier in accordance with the second configuration, in which the carrier is configured to transport the monitoring device for passage through the oven in its lowest range of adjustments.
Figure 9:
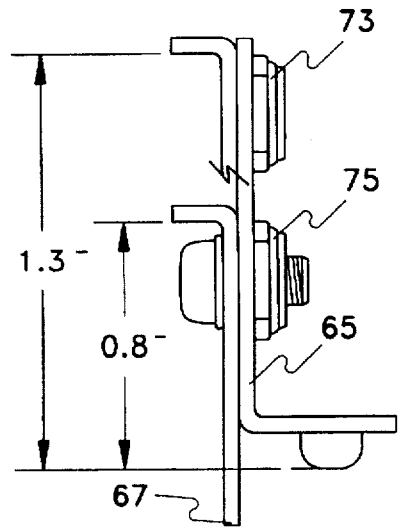
FIG. 9 is an end view of an inner rail and an outer rail of the second configuration of carrier, arranged to transport the monitoring device in its next-to-lowest range of adjustments.

The height at which the carrier and monitoring device enter and pass through the oven may be set so that the monitoring device, whatever its thickness, can be vertically centered with respect to the entry and exit ports of the oven. This vertical settability is achieved as follows:

Using first inner rail 65 as an example, it has, swaged or otherwise affixed to its vertical portion, two pairs of lock nuts, 73, 77, and 75, 79, installed at respective holes in the vertical portion of first inner rail 65. Each of those lock nuts can receive a screw passing through a slot in the vertical portion of first outer rail 67 in order to affix first outer rail 67 to first inner rail 65. A gross setting of the height of the carrier with respect to the edge conveyor is made by a determination whether the vertical portion of first outer rail 67 will extend downwardly (as in FIG. 5) from the flange thereof, or upwardly as in FIG. 10 and FIG. 11. Another setting of height is made by determining which pair of lock nuts 73–79 will be used in affixing first outer rail 67 to first inner rail 65. If first lock nut 73 and third lock nut 77 receive screws passing through the slots in first outer rail 67, the carrier will ride in its lowest range of positions with respect to the edge conveyor of the oven as shown in FIG. 5 and FIG. 8. An intermediate range of height positions can be obtained by using lock nuts 75 and 79 to receive screws passing through the slots in first outer rail 67, as illustrated in FIG. 9. A higher range of positions of the carrier with respect to the oven may be achieved if first outer rail 67 is reversed so that the vertical portion extends upwardly from the horizontal flange as in FIG. 10 and first lock nut 73 and third lock nut 77 receive screws passing through the slots in the vertical portion of first outer rail 67. The highest range of positions of the carrier with respect to the oven may be achieved if the reversed first outer rail 67 has screws passing through its slots into second lock nut 75 and fourth lock nut 79 respectively. Once again, the coarse determinant of height is whether the vertical portion of first outer rail 67 extends downwardly from the flange of the rail, as in FIG. 5, FIG. 8, and FIG. 9, or whether the vertical portion extends upwardly from the flange as in FIG. 10 and FIG. 11.

A fine adjustment of height can be obtained by means of a first slanted slot 81 and a second slanted slot 83, formed in second outer rail 71, as best illustrated in FIG. 5. It will be understood that second outer rail 71, rather than first outer rail 67, has been chosen merely for clarity of exposition because of what can be seen in FIG. 5 of the drawings. After a decision has been made whether the vertical portions of the outer rails should extend upwardly or downwardly from the flanges thereof, and after the further decision has been made as to whether the upper pair or the lower pair of lock nuts should be engaged, the final decision relates to the positioning of a first rail screw 85 and a second rail screw 87 in first slanted slot 81 and second slanted slot 83 respectively. As can be seen in FIG. 5, the positioning of first rail screw 85 and second rail screw 87 in their respective slots affords a free degree of adjustment of the height of the carrier with respect to the oven within whichever of the four coarse increments of position illustrated in FIGS. 8–11 has been selected. This combination of coarse positioning and free adjustment permits continuous vertical location from the lowest to the highest elevation of the thermal profiler. When first rail screw 85 and second rail screw 87 are tightened, the selection of height of the carrier is complete. It is important to note that first slanted slot 81 and second slanted slot 83 should be parallel so that second outer rail 71 will remain parallel to second inner rail 69 and also to the longitudinal axis of elongated support deck 21.

Figure 10:
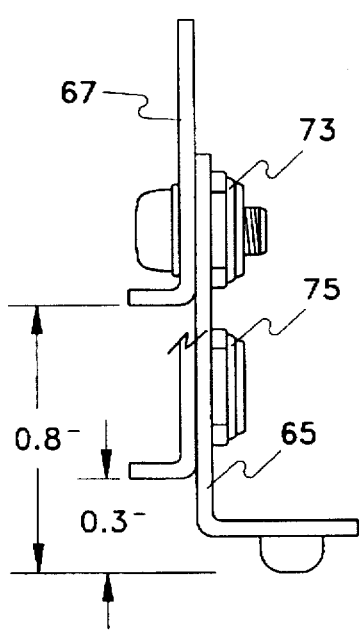
FIG. 10 is an end view of an inner rail and an outer rail of the second configuration of carrier in which the monitoring device is to be transported through the oven in its next-to-highest range of adjustments.
Figure 11:
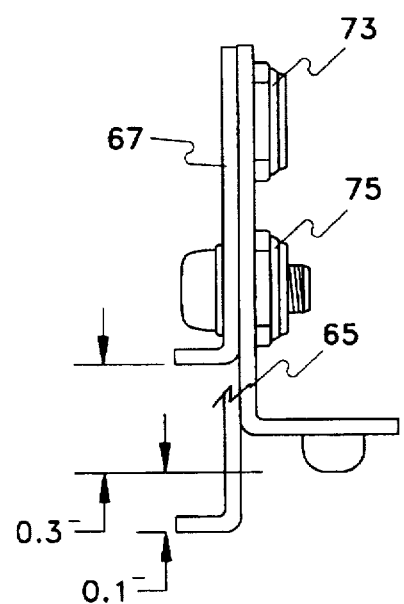
FIG. 11 is an end view of an inner rail and an outer rail of a carrier of the second configuration in which the carrier is disposed to transport the monitoring device through the oven in its highest range of adjustments.

Merely by way of illustration, and not of limitation, the possible relative positions of the outer rail, such as first outer rail 67, and the inner rail, such as first inner rail 65, are shown in FIGS. 8 through 11 of the drawings. For a representative carrier, the possible vertical accommodation mounts to a total of 2.0". It will be understood that, in each of the aforementioned figures of the drawings, the outer rail appears on the left, while the inner rail appears on the right. The attachment of one to the other is made by means of the screws and the lock nuts or other securing devices such as first lock nut 73, shown in those figures. If the adjacent lock nuts in the inner rail are spaced apart by one-half inch, the choice as to whether the upper pair or the lower pair of lock nuts will be used gives an increment of one-half inch in the relative vertical positioning as between the outer rail and the inner rail. And, of course, inverting the outer rail gives an additional increment of vertical positioning, as is illustrated in FIG. 10 and FIG. 11, wherein the flange of the outer rail in its inverted position can reach below the horizontal portion of the inner rail.

An additional advantage of the design of the carrier for vertical settability is that the two rails may be independently set to different vertical heights. This is necessary when the carrier is used in one of the newest reflow ovens, which feature a third, height-adjustable endless-chain conveyor located between the left and right edge conveyors. The purpose of this third chain conveyor is to provide support to the center of wide circuit boards as they pass through the reflow oven, to prevent them from sagging when heated. To accomplish this, the circuit board is placed on the edge conveyors, and the third chain conveyor is positioned near the center of the circuit board, and raised until it contacts the bottom of the circuit board or the components thereon.

Thus the height of the upper surface of the third chain conveyor relative to the edge conveyors is determined by the thickness of the components that it bears against on the bottom of the circuit board. Under these circumstances, the carrier is supported on one side by an edge conveyor and on the other side by the third chain conveyor, which may be set at a different height. Thus to maintain the carrier and the monitoring device parallel with the upper and lower baffles at the portals of the oven, it is necessary to independently adjust the vertical height of the two side rails. This is permitted by the design of the side rails.

Having described the structure of the carrier in accordance with the invention, it will be useful to enumerate one possible sequence of steps to be followed in preparing the carrier for use. The series of steps will refer particularly to the second configuration of carrier, which is intended for use in reflow ovens. As has been explained, the relative height of the carrier with respect to the entry and exit portals of the oven is especially important with the reflow oven. A suggested sequence of steps is as follows:

A. To accommodate the height of the carrier to the portals of the oven:

1. Measure the distance from the top of the edge conveyors in the oven to the top of the highest obstruction in the bottom of the oven which must be cleared by the carrier in passing through the oven. From that distance, subtract ¼ inch for clearance. This difference is the height setting which determines the relative orientation and positioning of the outer rails with respect to the inner rails of the carrier.

2. Select the configuration from among the representations of FIG. 8 through FIG. 11 which comprehend this height setting. The orientation of the outer rail with respect to the inner rail, and the determination whether to use the upper pair or the lower pair of lock nuts will thus be defined.

3. For the final adjustment of relative height, tighten the screws at the appropriate locations on first slanted slot 81 and second slanted slot 83.

B. To accommodate the carrier to the monitoring device:

1. Rotate first pivoted support arm 29 and second pivoted support arm 31 so that they are approximately perpendicular to the longitidinal axis of elongated support deck 21.

2. Place the monitoring device symmetrically on the support deck, with its trailing end resting against upturned backstop 23.

3. If the monitoring device is relatively short (10" or less in the present typical structure,) pivot the support arms toward upturned backstop 23 until they contact the respective sides of the monitoring device. On the other hand, if the monitoring device is more lengthy, the support arms should be pivoted away from upturned backstop 23 to contact the monitoring device on its respective sides farther away from upturned backstop 23.

4. Having positioned the upturned ends of the respective pivoted support arms against the sides of the monitoring device, remove the monitoring device and tighten first screw 33 and second screw 35 to lock the respective support arms in position.

C. To match carrier width to the width of the circuit board to be monitored:

1. For relatively narrow circuit boards, leave first pivot screw 49 snug at the aft end of aft longitudinal slot 27, while second pivot screw 51 is loosened.

2. Pull first outer rail 67 and second outer rail 71 apart until the width, measured across the horizontal flanges of those rails, is equal to the width of the circuit board.

3. Tighten second pivot screw 51 to maintain that width of the carrier.

4. If the circuit board is relatively wide, second pivot screw 51 should be set relatively snug at the aft end of forward longitudinal slot 25 and first pivot screw 49 is loosened.

5. Then, the rails should be separated until the distance across the horizontal flanges is equal to the width of the circuit board. At that time, first pivot screw 49 should be re-tightened to lock the rails in their adjusted positions.

The structure of the carrier and a typical series of steps for preparing it for its intended function have been set forth. As has already been explained, the function of the carrier is to transport a monitoring device, or other instrumentation, through a soldering machine or oven, or possibly another industrial processing machine.

The most-favored configurations of carrier in accordance with the invention have been fully described, and their mode of operation has been fully explained. Various changes may be made in the structure of the carrier and in its mode of operation without departing from the scope of the invention. Accordingly, the scope of the invention is defined only by the following claims and their equivalents.

What I claim as new and desire to secure by Letters Patent of the U.S. is as follows:

1. A carrier for supporting a monitoring device during passage of said carrier and said monitoring device through a processing machine, said carrier comprising:
   (a) an elongated support deck having a longitudinal axis for substantial alignment with the direction of said passage of said carrier and said monitoring device through said processing machine,
   (b) first and second pairs of scissor arms, each arm of each such pair having inner and outer extremities, the inner extremity of each arm being pivotally coupled to said elongated support deck, and the arms of said first and second pairs being disposed for extension respectively in first and second directions which are opposite to each other and approach perpendicularity to said longitudinal axis of said elongated support deck,
   (c) first and second rails pivotally coupled to said outer extremities of, respectively, said first and second pairs of scissor arms and oriented in a direction substantially parallel to said longitudinal axis of said elongated support deck,
   (d) means associated with said elongated support deck for urging said monitoring device in said direction of passage of said carrier and said monitoring device through said processing machine, and
   (e) first and second support arms pivotally and securably coupled to said elongated support deck for respectively engaging opposite sides of said monitoring device to restrain relative motion between said monitoring device and said elongated support deck in directions having components perpendicular to said longitudinal axis of said elongated support deck.

2. A carrier in accordance with claim 1 in which the point of pivotal coupling of the inner extremity of at least one scissor arm of each of said first and second pairs of scissor arms is adjustable along said elongated support deck in a direction parallel to said longitudinal axis of said elongated support deck.

3. A carrier in accordance with claim 1 in which the respective points of pivotal coupling of inner extremities of both scissor arms of each of said first and second pairs of scissor arms are adjustable along said elongated support deck in a direction parallel to said longitudinal axis of said elongated support deck.

4. A carrier in accordance with claim 1 in which respective outer extremities of at least one of each of said first and second pairs of scissor arms are pivotally coupled to said first and second rails at points which are adjustable along said first and second rails in a direction parallel to said longitudinal axis of said elongated support deck.

5. A carrier in accordance with claim 1 in which each of said first and second rails has a longitudinal flange for support of said carrier by said processing machine.

6. A carrier in accordance with claim 3 in which said elongated support deck has a slot, substantially parallel to said direction of passage, for accommodating each of said respective points of pivotal coupling thereto of inner extremities of said scissor arms.

7. A carrier in accordance with claim 4 in which each of said first and second rails has at least one longitudinal slot for accommodating a point of coupling of the outer extremity of a scissor arm thereto.

8. A carrier in accordance with claim 6, further including securable means for pivotally coupling said scissor arms to said elongated support deck.

9. A carrier in accordance with claim 7, further including means for pivotally coupling each of said first and second rails to the outer extremity of each of said scissor arms.

10. A carrier in accordance with claim 1 in which said urging means comprises an upturned flange associated with one end of said elongated support deck for bearing against said monitoring device.

11. A carrier in accordance with claim 1 in which each of said first and second rails comprises, in combination, an inner rail having a substantially right-angular cross section and an outer rail adjustably secured thereto by removable fasteners.

12. A carrier in accordance with claim 11 in which the orientation of each said outer rail with respect to each respective said inner rail having a substantially right-angular cross section is reversible.

13. A carrier in accordance with claim 11 in which each said outer rail has parallel diagonal slots for accommodation of respective ones of a plurality of said removable fasteners.

14. A carrier in accordance with claim 1 in which said monitoring device is a thermal profiler for recording temperatures sensed by respective temperature sensors in contact with electronic components on a circuit board.

15. A carrier in accordance with claim 1 in which said first and second rails are separated sufficiently to rest upon, respectively, first and second conveyor chains of said processing machine.

16. A carrier in accordance with claim 1 in which said processing machine is a reflow soldering oven for circuit boards.

17. A carrier in accordance with claim 14 in which said elongated support deck further includes means for supporting and securing any surplus length in electrical conductors linking said thermal profiler to said respective temperature sensors.

18. A carrier in accordance with claim 17 in which said supporting and securing means comprise first and second posts attached to said elongated support deck.

19. A carrier in accordance with claim 1 in which each of said first and second rails is formed from titanium.

20. A carrier in accordance with claim 1 in which each of said first and second rails comprises, in a combination of Z cross section, a web oriented substantially perpendicular to the plane of said scissor arms, a first flange at a first edge of said web for pivotal coupling go the respective outer extremities of one pair of said scissor arms, and a second flange at a second edge of said web for interfacing with said processing machine.

21. A carrier in accordance with claim 20 in which each said first flange and said respective second flange extend in opposite directions from said respective web.

22. A carrier in accordance with claim 20 in which each said web is wider than either said respective first flange or said respective second flange.

23. A carrier in accordance with claim 1 in which said first and second rails are separated sufficiently to engage, respectively, the support fingers of first and second conveyor chains of said processing machine.

24. A carrier in accordance with claim 1 in which said processing machine is a wave soldering machine.

25. A carrier for supporting a monitoring device during passage of said carrier and said monitoring device through a processing machine, said carrier comprising:

(a) an elongated support deck having a longitudinal axis, (b) first and second pairs of scissor arms, each arm of each such pair having inner and outer extremities, the inner extremity of each arm being pivotally coupled to said elongated support deck, and the arms of said first and second pairs being disposed for extension respectively in first and second directions which are opposite to each other, (c) first and second rails pivotally coupled to said outer extremities of, respectively, said first and second pairs of scissor arms and oriented in a direction substantially parallel to said longitudinal axis of said elongated support deck, (d) means associated with said elongated support deck for urging said monitoring device in the direction of passage of said carrier and said monitoring device through said processing machine, and (e) means securably coupled to said elongated support deck for engaging opposite sides of said monitoring device to restrain relative motion between said monitoring device and said support deck in any direction having a component perpendicular to said longitudinal axis of said elongated support deck.

\* \* \* \* \*